(12) United States Patent
Verstege et al.

(10) Patent No.: US 8,169,333 B2
(45) Date of Patent: May 1, 2012

(54) MOTION DETECTOR FOR ANIMALS

(75) Inventors: Albertino Bernardo M. Verstege, Aalten (NL); Otto Theodorus J. Zents, Lichtenvoorde (NL); Hans Benedictus, Lichtenvoorde (NL)

(73) Assignee: NEDAP Agri B.V. (NL)

( * ) Notice: Subject to any disclaimer, the term of this patent is extended or adjusted under 35 U.S.C. 154(b) by 655 days.

(21) Appl. No.: 12/085,166

(22) PCT Filed: Nov. 11, 2006

(86) PCT No.: PCT/NL2006/000571
§ 371 (c)(1),
(2), (4) Date: Apr. 16, 2009

(87) PCT Pub. No.: WO2007/058525
PCT Pub. Date: May 24, 2007

(65) Prior Publication Data
US 2009/0302928 A1    Dec. 10, 2009

(30) Foreign Application Priority Data

Nov. 18, 2005   (NL) ...................................... 1030464

(51) Int. Cl.
*G08B 21/00* (2006.01)
(52) U.S. Cl. .................. 340/686.1; 340/689; 340/573.1; 200/61.52; 335/206

(58) Field of Classification Search ............... 340/686.1, 340/689, 690, 573.1, 573.4, 691.2; 200/52 R, 200/61.45 R, 61.52; 73/652, 654; 335/206
See application file for complete search history.

(56) References Cited

U.S. PATENT DOCUMENTS

| 4,697,174 | A | * | 9/1987 | Viator, Sr. ..................... 340/689 |
| 4,737,774 | A | | 4/1988 | Chapman et al. |
| 5,422,628 | A | | 6/1995 | Rodgers |
| 5,881,673 | A | | 3/1999 | Beach |
| 6,049,280 | A | | 4/2000 | Andersson |
| 6,604,422 | B2 | * | 8/2003 | Wei .................................. 73/652 |
| 7,450,025 | B2 | * | 11/2008 | Fong .......................... 340/686.1 |

FOREIGN PATENT DOCUMENTS

| EP | 0 705 536 | 4/1996 |
| GB | 2 076 259 | 11/1981 |
| NL | 1012872 | 2/2001 |

OTHER PUBLICATIONS

International Search Report dated Mar. 6, 2007.

* cited by examiner

*Primary Examiner* — Anh V La
(74) *Attorney, Agent, or Firm* — Jacobson Holman PLLC (57) ABSTRACT

A motion detector, in particular suitable for animals, comprising at least one motion element, wherein an element movable within a predetermined area is located, which brings about an electrical connection in at least one position, wherein the movable element is a magnetic element, which can move along a path of travel formed by a cavity in the motion element, and wherein, near the path of travel, at least one magnetically sensitive switching element is placed, which can be influenced by the magnetic element.

28 Claims, 6 Drawing Sheets

MOTION DETECTOR FOR ANIMALS

This is a national stage of PCT/NL2006/000571 filed Nov. 20, 2006 and published in English.

The invention relates to a motion detector, in particular suitable for animals, comprising at least two electrical switching elements and at least one motion element in which at least one element movable within a predetermined area is located, wherein each of the switching elements can be excited depending on the position of the at least one movable element within the at least one motion element.

Such a motion detector is known from U.S. Pat. No. 4,737,774.

Such motion detectors are, for instance, used as an activity meter, with which, for instance, the heat of cows can be detected. Also for other animals, such as for instance pigs and sheep, such activity meters are used. The motion detector according to the American patent comprises, as the movable element, a magnetic element and, as a switching element, a magnetically sensitive switching element which can be influenced by the magnetic element.

Another known type of motion detector comprises a glass tube, which is, at least at one end, provided with two contacts. In the tube, a mercury drop is present which moves to the one or the other end of the tube, depending on the orientation of the tube. When the mercury drop is located at an end of the tube provided with contacts, the contacts are electrically interconnected via the mercury drop.

Alternatively, in another known detector, a ball from conductive material is used instead of a mercury drop. The switching element is then excited as a result of the ball moving against it and electrically conductively interconnects contacts of the switching element. A switching element and a motion element comprising the ball then together form at least one ball switch known per se. A drawback of the use of a ball is that it is much more movable than a mercury drop. A mercury drop has a certain hysteresis in the sense that the mercury drop does not move already with very slight movements of the animal in such a manner that the electrical contact with the contacts is broken. With use of a ball this is the case, so that, in certain positions of the switch, for instance during grazing and/or chewing of the animal, contact bounces can occur, with the result that the activities of the animal are represented incorrectly.

In general, the invention contemplates providing an efficient and reliably operating motion detector for animals. According to one aspect of the invention, to this end, the motion detector is characterized in that at least one of the switching elements acts as a reset switch for at least one of the other switching elements. This prevents the creation of contact bounces, which means that successively, with one of the switching elements, switching moments are registered while this is not the result of a clear movement of the motion detector but of the fact that the movable element moves with repeated small movements around a position in which the respective switching element can be excited. Thus, abovementioned contact bounces can be prevented, independent of the type of switching element used, so also with use of a ball switch. Other types of switching elements, such as magnetically sensitive switching elements, may also be used. In that case, as a movable element, a magnetic element can be used.

In particular, it holds that the motion detector is provided with an electronic circuit which is connected with the switching elements and which is arranged such that above-mentioned action as a reset switch is obtained. According to a first further elaboration of the invention, it holds that the electronic circuit is arranged for registering an excitation of one of the above-mentioned other switching elements only after first an excitation of the switching element acting as a reset switch has again taken place.

According to a preferred embodiment, it holds that the electronic circuit is arranged for counting the number of excitations of at least one of the above-mentioned other switching elements. In particular, it then holds that the electronic circuit is arranged such that an excitation of one of the other above-mentioned switching elements is counted only after first an excitation of the switching element acting as a reset switch has again taken place.

The invention further relates to a motion detector, in particular suitable for animals, comprising at least one motion element, in which an element movable within a predetermined area, which brings about an electrical connection in at least one position, the movable element being an magnetic element, which can move along a path of travel formed by a cavity in the motion element, while, near the path of travel, at least one magnetically sensitive switching element is placed, which can be influenced by the magnetic element.

Examples of suitable magnetically sensitive switching elements are reed switches and Hall sensors.

In the following, the invention will be described in more detail with reference to the appended drawing of some exemplary embodiments, in which.

Figures 1, 3:
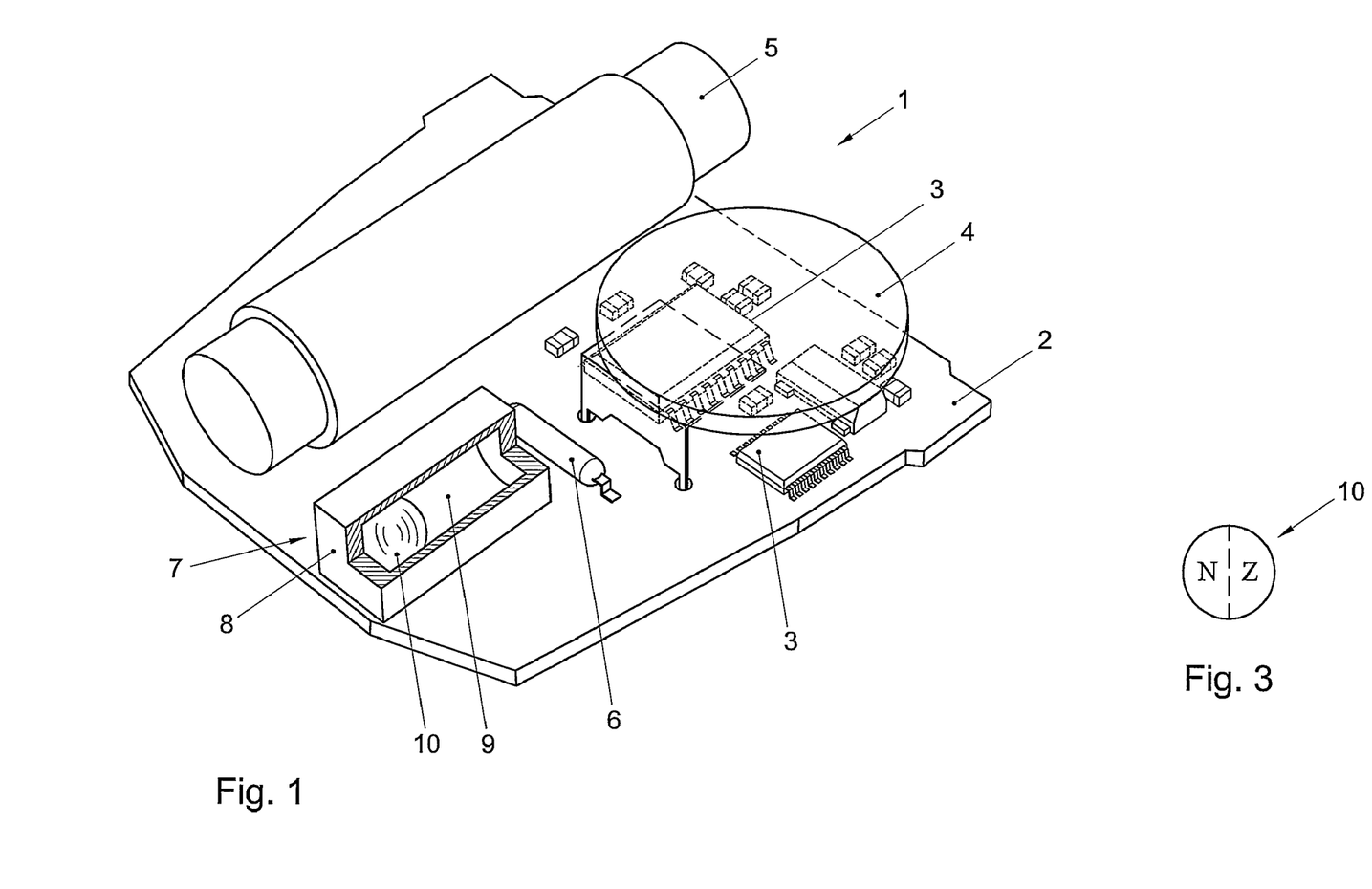
FIG. 1 schematically shows a first exemplary embodiment of a motion detector according to a first aspect of the invention.
FIG. 3 illustrates an example of a motion element for use in the invention.

FIG. 1 schematically shows an example of a motion detector 1 according to the invention, where, for the sake of clarity, the external housing has been omitted. The housing is provided with fixing means for fixing the motion detector to, for instance, an animal.

The Figure shows a base plate, for instance a PC board or mounting plate 2, which bears an electronic circuit 3 with a number of electronic components, a battery 4 and a transmitting/receiving coil 5.

The base plate 2 further bears a reed switch 6, which is located next to a motion element 7. The motion element comprises a, preferably airtight, housing 8, shown in cutaway view, which has an internal elongated cavity 9, which forms a path of travel for a ball 10. The ball is a spherical magnet with a north and a south pole as indicated with N and Z in FIG. 3. The ball can roll along the path of travel 9 if the orientation of the motion detector changes due to the fact that the animal carrying the motion detector moves. In the example shown, the path of travel extends substantially parallel to the base plate.

If the ball is located at the end of the path of travel 9 located proximal to the reed switch, the reed switch is already in a different condition from when the ball is located at the end of the path of travel remote from the reed switch. The reed switch may have various embodiments known per se, which are all applicable in the motion detector according to the invention. Thus, the reed switch may comprise, for instance, a make contact, a break contact or a make-and-break contact.

With use of a make contact, in rest, contact springs of the reed switch lying clear of one another are contacted with one another as soon as a magnet is brought into the proximity of the reed switch. When the magnet is removed, the contact between the contact springs is broken again. The making and/or breaking of the contact between the contact springs of the reed switch can be detected and, for instance, counted with the aid of a suitable electronic circuit in a manner known per se. This holds for both a make contact and a break contact. With a make-and-break contact, detection of the change of the contact from a first position to a second position and vice versa is possible in a similar manner.

With the switching of a reed switch, a hysteresis effect occurs, so that the detector becomes insensitive to very small movements, such as for instance those occurring during grazing or chewing of an animal, and contact bounces are prevented.

In the exemplary embodiment of FIG. 1, with use of a reed switch with a make contact, the contact between the contact springs of the reed switch is made as soon as the ball magnet 10 is located at the end of the path of travel 9 located proximal to the reed switch. The closing of the reed switch provides the electronic circuit 3 connected with the reed switch with a pulse. The circuit 3 may comprise a counter to count the received pulses.

With the aid of known RFID techniques, the counter can contactlessly be read out, preferably together with the identity of the animal, via the transmitting/receiving coil 5 and then be stored and/or processed further in, for instance, a farm computer. The reading of the counter is a measure for the activity of the animal.

Figure 2:
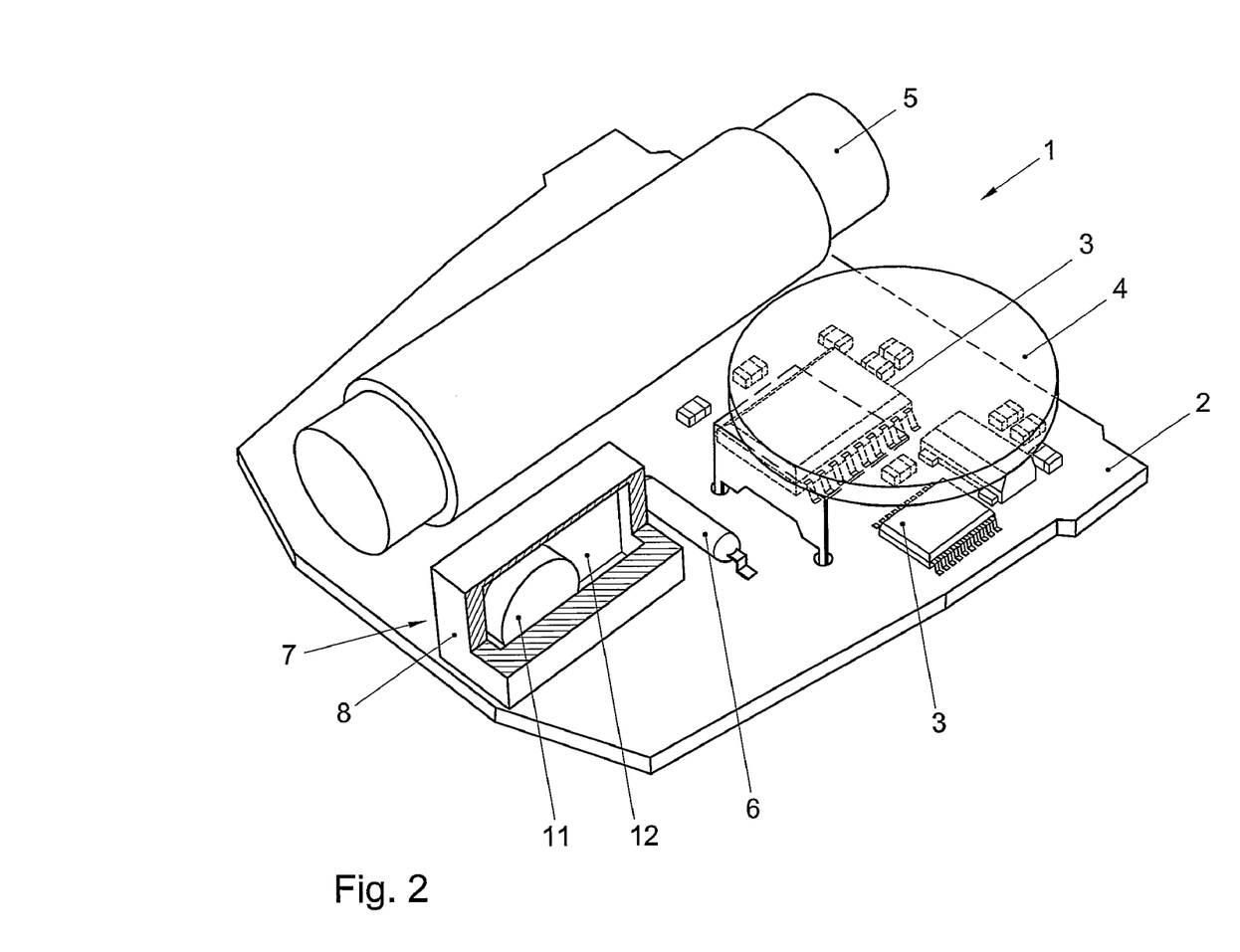
FIG. 2 schematically shows a second exemplary embodiment of a motion detector according to a first aspect of the invention.

In the exemplary embodiment of FIG. 2, a differently shaped magnetic element is used. Instead of a spherical magnet, a flat cylindrical disc-shaped magnet 11 is used with a corresponding cavity 12 in the housing 8. The poles of the magnet are located on the flat sides of the disc-shaped magnet facing away from each other. The action is similar to the action of the embodiment of FIG. 1.

A motion detector according to the invention may be arranged for being fixed to a body part of an animal or person by some means or other. With an animal, the motion detector may, for instance, be fixed to the neck or to a leg. With a person, the motion detector may, for instance, act as a step counter.

In the framework of this patent application, therefore, the term animal(s) is also understood to include a person or persons.

Depending on the manner of fixing the motion detector to an animal, if desired, the path of travel may be placed at an angle with respect to the base plate, so that the magnetic element has a preferred position under the influence of gravity. This may, for instance, be a position near the reed switch. Due to such an arrangement, it can be realized that only movements having a significant vehemence and/or travel are detected.

Figure 4:
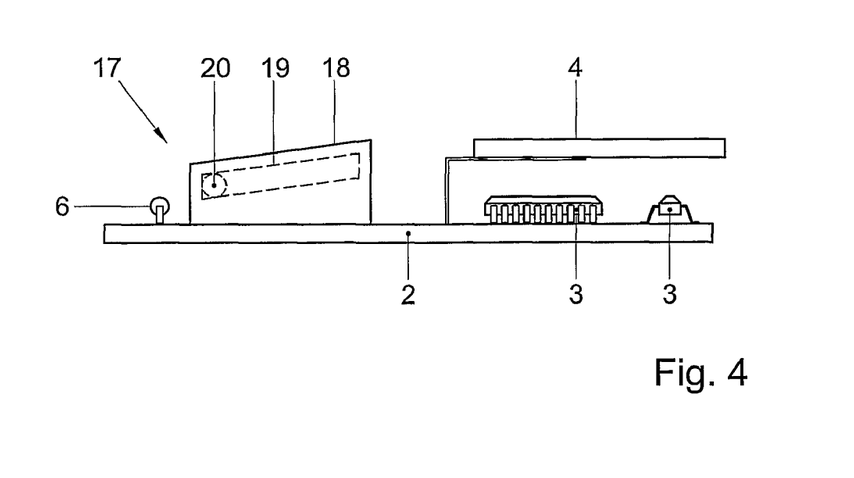
FIG. 4 schematically shows a third exemplary embodiment of a motion detector according to a first aspect of the invention.

An example of such an arrangement is schematically shown in FIG. 4. FIG. 4 shows a motion element 17 provided on a base plate 2, with a housing 18, in which an elongated cavity 19 extends, which forms a path of travel for a magnetic element 20. The path of travel extends at an angle with respect to the base plate and has a lowest end 21, which is located closest to the base plate 2, and a highest end, which is at a distance from the base plate. Near the lowest end, there is a reed switch 6. In this example, the lowest end forms a position of rest for the magnetic element. Further, in FIG. 4, some electronic components 3 and a power supply battery 4 are schematically indicated.

Figure 5:
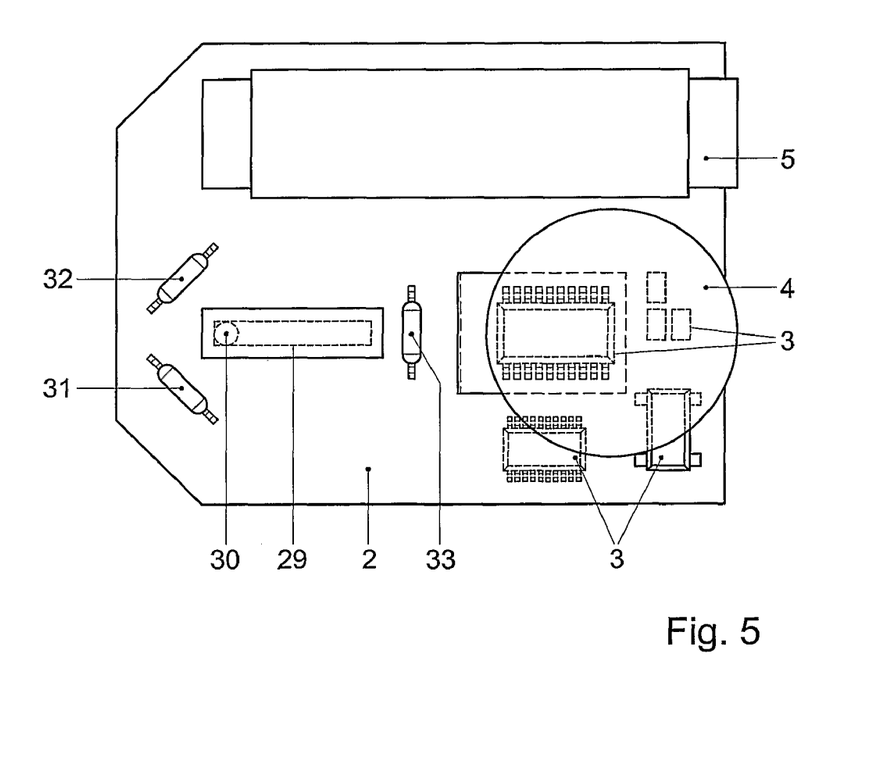
FIGS. 5-9 schematically show some examples of motion detectors according to a second aspect of the invention.

FIG. 5 schematically shows, in top plan view, a variant of a motion detector according to the invention, where two reed switches 31, 32 are provided near one of the ends of a path of travel 29 for a magnetic element 30 optionally placed at an angle with the base plate 2. The electronic circuit may then, for instance, be arranged such that a count pulse is only generated if both reed switches change condition. The motion detector may further be provided with a third reed switch 33. The reed switches 31-33 are connected with the electronic circuit 3. The electronic circuit 3 is arranged such that the reed switch 33 acts as a reset switch for the reed switches 31, 32. That means that, after a change of condition of the reed switches 31, 32 as discussed hereinabove (that means that a count pulse is only generated if both reed switches 31, 32 change condition), a next change of condition of the same switches 31, 32 is counted only after first the reed switch 33 has been excited again. The electronic circuit 3 may also be arranged such that the reed switches 31, 32 act as a reset switch for the reed switch 33. That means that, after a change of condition of the reed switch 33, a next change of condition of the same switch 33 is counted only after first the reed switches 31, 32 have been excited again as discussed hereinabove (a reset pulse being generated only if both reed switches 31, 32 change condition).

Figure 6A:
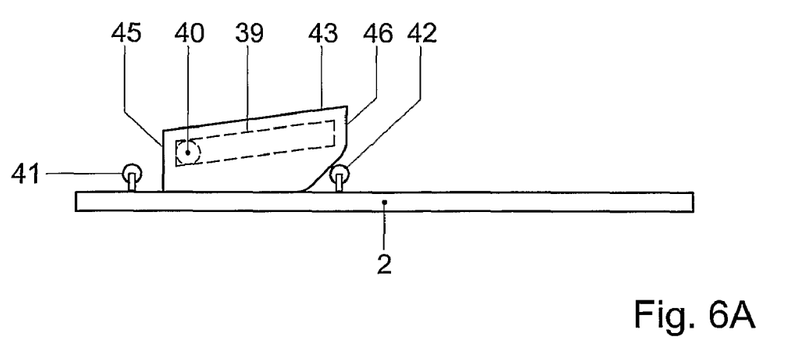

FIG. 6A schematically shows, in side elevational view, another exemplary embodiment of a motion detector according to the invention, where a switching element 43 with an inclined path of travel 39 and with a magnetic element 40 is used, while a reed switch 41 and 42, respectively, are located near both ends 45 and 46, respectively, of the path of travel. The electronic circuit 3 may then, for instance, be arranged such that the one reed switch, for instance the right reed switch 42, acts as a reset switch. That means that, after a change of condition of the other reed switch, for instance the left (in the Figure) switch 41, a next change of condition of the same switch 41 is counted only after first the right switch 42 has been operated again. However, it is also possible that switch 41 acts as a reset switch for the switch 42.

Figure 6B:
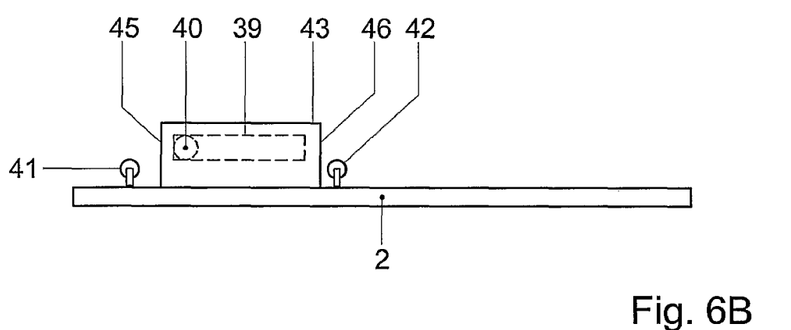

In a variant shown in FIG. 6B, a motion element with a path of travel which is substantially parallel to the base plate 2 can be used, with a reed switch near each end of the path of travel. Here, it also holds that, for instance, the electronic circuit 3 may be arranged such that the one reed switch, for instance the right reed switch 42, acts as a reset switch. That means that, after a change of condition of the other reed switch, for instance the left (in the Figure) switch 41, a next change of condition of the same switch 41 is counted only after first the right switch 42 has been operated again. However, it is also possible that switch 41 acts as a reset switch for the switch 42.

Figure 7A:
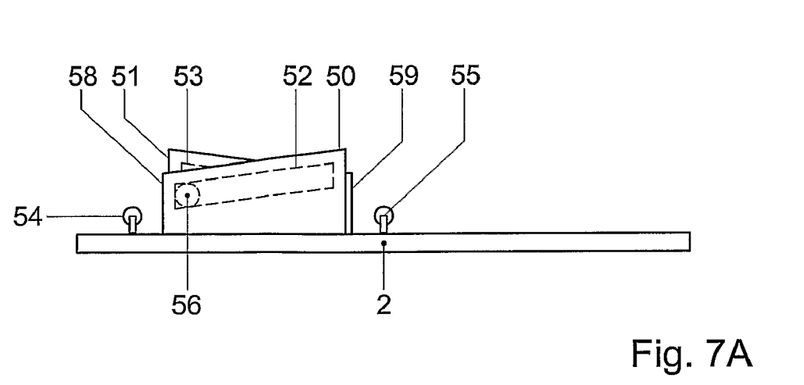
Figure 7B:
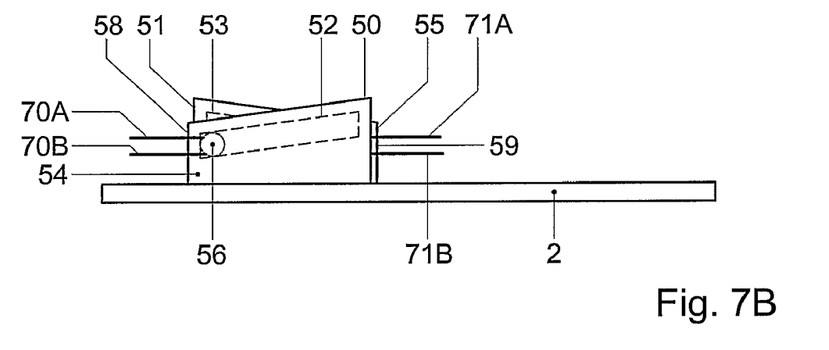

FIG. 7A schematically shows, in side elevational view, an exemplary embodiment of a part of a motion detector according to the invention where multiple motion elements, in this example two, designated by 50 and 51, are used, which both have a path of travel 52, 53, which include an angle with the base plate. A magnetic element 56 is included in the path of travel 52 and a magnetic element 57 is included in the path of travel 53. However, the paths of travel may also be parallel to the base plate, or include different angles with the base plate. In the example shown, the angles between the paths of travel and the base plate are substantially equal, but the paths of travel incline in opposite directions with respect to the base plate. Further, in this example, near the ends of the paths of travel 52 and 53, respectively, located closest to the base plate, reed switches 54 and 55, respectively, are provided. The reed switch 54 can thus detect the magnetic element 56 associated with path of travel 52 when the magnetic element 56 is located near the end 58 of the path of travel 52 located closest to the base plate (this condition is shown in FIG. 7). The reed switch 55 can thus detect the magnetic element 57 associated with the path of travel 53 when the magnetic element 57 is located near the end 59 of the path of travel 53 located closest to the base plate. Also in this case, the one reed switch (54 or 55) can have a reset function for the other reed switch (55 or 54). In this use, two "normal" ball switches may also be used, the one ball switch acting as a reset switch for the other. Due to the reset function, the effect of contact bounces is obviated. In FIG. 7A, the reed switches 54 and/or 55 can then be omitted and (optionally non-magnetic) electrically conductive balls 56 and/or 57 can be used. The reed switches 54 and/or 55 are then replaced by switching elements 54 and/or 55 which can register a contact with the balls. Thus, in FIG. 7A, the reed switches 54 can be replaced by a switching element 54 known per se which can be excited by contact with an electrically conductive ball 56 (see FIG. 7B). The switching element 54 comprises, for instance, two electrically conductive contacts 70A and 70B which extend into the path of travel 52 near the end 58 of the path of travel 52. When the ball 56 rolls against these contacts 70A, 70B, the contacts are electrically conductively interconnected which implies an excitation of the switching element which can be registered by the electronic circuit. The switching element 54 (comprising the contacts 70A and 70B) and the motion element 50 then form a ball switch known per se. Further, completely analogously, the reed switch 55 can be replaced by a switching element 55 known per se which is excited by contact with an (optionally non-magnetic) electrically conductive ball 57. To this end, the switching element comprises, for instance, two electrically conductive contacts 71A and 71B which extend into the path of travel 53 near the end 59 of the path of travel 53. When the ball 57 rolls against these contacts 71A, 71B, the contacts are electrically conductively interconnected which implies an excitation of the switching element which can be registered by the electronic circuit. The switching element 55 (comprising the contacts 71A and 71B) and the motion element 51 then form a ball switch known per se. Also in this case, the one switching element (54 or 55) can have a reset function for the other switching element (55 or 54).

Completely analogously, in FIGS. 6A and 6B, the reed switches 41 and/or 42 may also be replaced by switching elements 41, 42, each with contacts as discussed for FIG. 7B and an electrically conductive (optionally non-magnetic) ball 40 can be used. Such a switching element 41 with at least two contacts 70A, 70B and the motion element 43 then again forms a ball switch known per se. Further, such a switching element 42 with contacts 71A and 71B and the motion element 43 then forms a ball switch (see FIG. 6C).

Figure 6C:
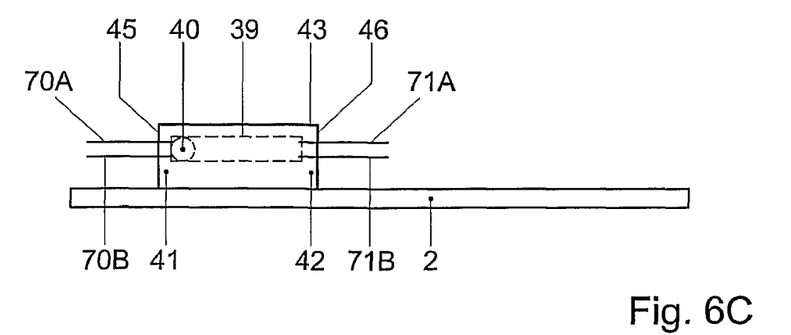

So, for the motion detectors according to FIGS. 5-7, it holds that the at least two switching elements are at a distance from one another. Further, it holds for the motion detectors according to FIGS. 5, 6A, 6B, 6C that a first switching element 31, 32, 41 of the at least two switching elements is excited by a movable element 30, 40 when the movable element is in a first position and that a second switching element 33, 42 of the at least two switching elements is excited by the same movable element 30, 40 when the movable element is in a second position which differs from the first position. Here, it further holds in the example of FIGS. 5, 6A, 6B, 6C that the first position and the second position are each outermost positions which the movable element can take up within its motion element. For the embodiment according to FIGS. 7A, 7B, it holds that the motion detector is provided with at least one first switching element 54, at least one second switching element 55, at least one first motion element 56 and at least one second motion element 57, while the motion detector is arranged such that the first switching element can be excited by the first motion element and the second switching element can be excited by the second motion element.

Further, for instance, the at least one first switching element 54 can act as a reset switch for the at least one second switching element 59. For FIGS. 5, 6A, 6B, 6C, 7A, 7B, it holds in this example that the motion detector is provided with an electronic circuit 3 (for reasons of simplicity not shown in FIGS. 5, 6A, 6B, 6C, 7A, 7B) which is connected with the switching elements and which is arranged such that above-mentioned action as a reset switch is obtained. Here, it holds in this example that the electronic circuit 3 is arranged for registering an excitation of one of the above-mentioned other switching elements 31, 32, 41, 54 or 33, 42, 55 only when prior to this excitation, an excitation of the switching element 33, 42, 55 or 31, 32, 41, 54 acting as a reset switch has taken place. In this example, it further holds for all embodiments that the electronic circuit 3 is arranged for counting the number of excitations of at least one of the above-mentioned other switching elements 31, 32, 41, 54 or 33, 42, 55.

For FIGS. 5, 6A, 6B, 6C, 7A, 7B, it further holds that the electronic circuit 3 is arranged such that an excitation of one of the other above-mentioned switching elements is counted only when prior to this excitation, an excitation of the switching element acting as a reset switch has taken place. For FIGS. 6C and 7B, it further holds that at least one of the switching elements together with the at least one motion element is designed as a conventional ball switch. Further, it holds for the embodiment as shown in FIGS. 6C and 7B that the switching elements together with the at least one motion element are designed as conventional ball switches. Here, it further holds that at least one of the ball switches 70A, 70B, 43; 70A, 70B, 50 acts as a reset switch for another ball switch 71A, 71B, 43; 71A, 71B, 51. For FIG. 7B it further holds that a first switching element 70A, 70B together with a first motion element 50 is designed as a ball switch and that a second switching element 71A, 71B with a second motion element 51 is designed as a second ball switch. Here, for instance, the second ball switch 71A, 71B, 51 can act as the reset switch for the first ball switch 70A, 70B, 50.

In the example of FIG. 7, the paths of travel 52, 53 of the motion elements 50, 51 are in parallel planes transverse to the mounting plate 2.

With use of two or more motion elements, the paths of travel may also be in planes transverse to the mounting plate which, two by two, include an angle with one another. Here, the paths of travel may or may not be parallel to the plane of the mounting plate. The motion elements may each cooperate with one or more reed switches again but may also be designed as ball switches as discussed hereinabove.

With such an embodiment, movements in different directions may be detected better.

After the foregoing, various modifications are readily apparent to a skilled person. Thus, instead of a ball or a disc, a differently shaped magnetic element may be used, for instance a rod-shaped element with a circular cross section. The magnetic element preferably needs to be able to roll along the path of travel, but in principle a magnetic element moving in a gliding manner may also be used, which then does not need to have a round cross section.

Further, instead of reed switches, other magnetically sensitive switching elements may also be used, such as for instance Hall elements. The reed switches or Hall elements and the like may be integrated in the housing of the motion elements, so that the motion element together with one or more magnetically sensitive elements forms a single component.

Figure 8:
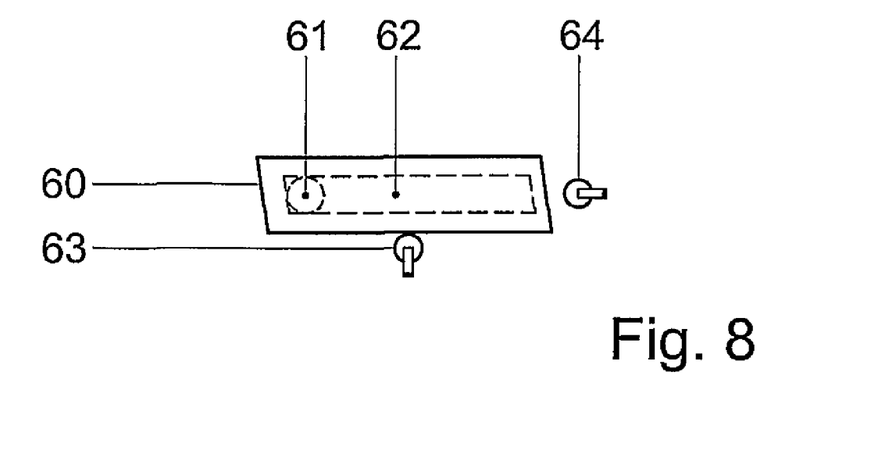
Figure 9:
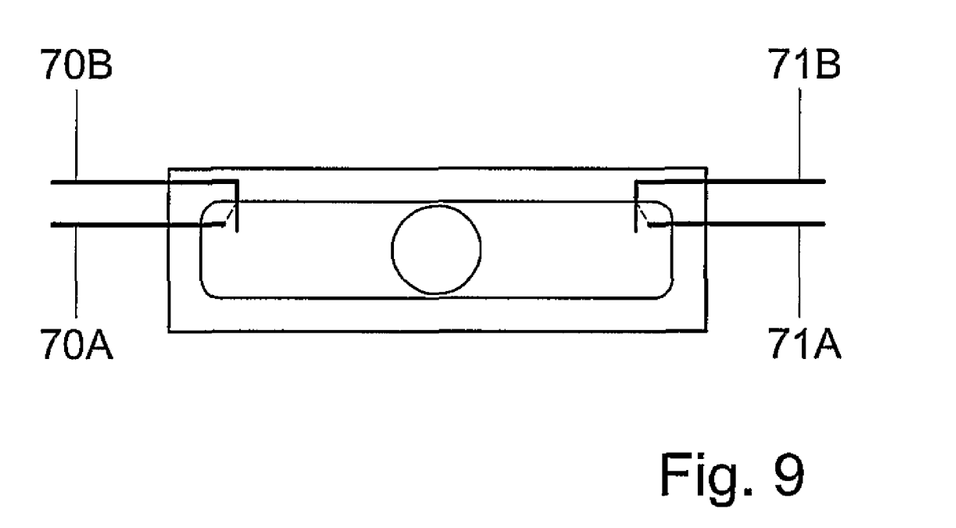

It is also conceivable that, along the path of travel of the magnetic element, a reed switch or Hall element and the like is placed, optionally in combination with a reed switch or the like near one or both ends of the path of travel. In this manner, the passing of the magnetic element can be detected. This is schematically shown in FIG. 8. Halfway along a path of travel 62 in a motion element 60 of a magnetic element 61, a reed switch 63 or Hall element or the like is placed. If further, a reed switch 64 is used which is, for instance, arranged at an end of the path of travel, the electronic circuit can be designed such that one of the reed switches acts as a reset switch as discussed hereinabove. For each embodiment, it holds that still other switching elements may be used. Thus, in FIGS. 5-7, other switching elements may be used than the above-mentioned ball switches. Thus, switching elements may be used with two electrically conductive spring-mounted contacts 70A, 70B; 71A, 71B which may be interconnected by, for instance, a non-conductive ball in that the contacts are pressed against one another by the ball in a spring-mounted manner (see for instance FIG. 9 in which the contact 70B is shown to be unexcited. The contact 70B is also shown in dotted lines when it is bent against the contact 70A by the ball. The same is analogously shown for the contacts 71A and 71B).

It is finally noted that a motion detector according to the invention could also be used for detecting other movements than of people or animals. For instance, a motion detector according to the invention could be mounted in or to a buoy in sea to detect the wave movement. Also, for instance uses in earthquake-sensitive areas are conceivable.

The invention claimed is:

1. A motion detector, in particular suitable for animals, comprising at least two electrical switching elements and at least one motion element in which at least one element movable within a predetermined area is located, wherein each of the switching elements can be excited depending on the position of the at least one movable element within the at least one motion element, characterized in that at least one of the switching elements acts as a reset switch for at least one of the other switching elements, characterized in that the motion detector is provided with an electronic circuit which is connected with the switching elements and which is arranged such that said action as the reset switch is obtained; characterized further in that the electronic circuit is arranged for registering an excitation of one of the other switching elements only when, prior to this excitation, an excitation of the switching element acting as the reset switch has taken place.

2. The motion detector according to claim 1, characterized in that the at least two switching elements are at a distance from one another.

3. The motion detector according to claim 1, characterized in that a first switching element of the at least two switching elements is excited by the movable element when the movable element is in a first position and that a second switching element of the at least two switching elements is excited by the same movable element when the movable element is in a second position which is different from the first position.

4. The motion detector according to claim 3, characterized in that the first position and the second position are each outermost positions which the movable element can take up within its motion element.

5. The motion detector according to claim 1, characterized in that the motion detector is provided with at least one first switching element, at least one second switching element, at least one first motion element and at least one second motion element, wherein the motion detector is arranged such that the first switching element can be excited by the first motion element and the second switching element can be excited by the second motion element and wherein the at least one first switching element acts as a reset switch for the at least one second switching element.

6. The motion detector according to claim 1, characterized in that at least one of the switching elements of a first motion element acts as a reset switch for one of the other motion elements.

7. The motion detector according to claim 1, characterized in that the electronic circuit is arranged for counting the number of excitations of at least one of the other switching elements.

8. The motion detector according to claim 7, characterized in that the electronic circuit is arranged such that an excitation of one of the other said switching elements is counted only when, prior this excitation, an excitation of the switching element acting as a reset switch has taken place.

9. The motion detector according to claim 1, characterized in that at least one of the switching elements together with the at least one motion element is designed as a conventional ball switch.

10. The motion detector according to claim 9, characterized in that the switching elements together with the at least one motion element are designed as conventional ball switches.

11. The motion detector according to claim 10, characterized in that at least one of the ball switches acts as a reset switch for another ball switch.

12. The motion detector according to claim 9, characterized in that a first switching element together with a first motion element is designed as a ball switch and that a second switching element with a second motion element is designed as a second ball switch.

13. The motion detector according to claim 12, characterized in that the second ball switch acts as a reset switch for the first ball switch.

14. The motion detector according to claim 1, characterized in that the at least one movable element is a magnetic element, which can move along a path of travel formed by a cavity in the at least one motion element, wherein the switching elements are magnetically sensitive switching elements, which can be influenced by the at least one magnetic element.

15. The motion detector according to claim 14, characterized in that the switching elements are placed near the path of travel of the at least one motion element.

16. The motion detector according to claim 14, characterized in that, as a magnetically sensitive switching element, a switching element from the group comprising reed switches and Hall elements is used.

17. The motion detector according to claim 14, characterized in that the cavity in the at least one motion element has a cross-sectional shape which corresponds with the shape of the at least one magnetic element, yet comprises the at least one magnetic element with a slight play, and that the at least one magnetic element has such a shape that it can roll along a path of travel formed by a cavity in the at least one motion element.

18. The motion detector according to claim 14, characterized in that the magnetic element is a spherical magnet.

19. The motion detector according to claim 14, characterized in that the at least one magnetic element is a disc-shaped magnet with a substantially circular peripheral shape.

20. The motion detector according to claim 14, characterized in that the magnetic element is a rod-shaped magnet with a substantially circular cross section.

21. The motion detector according to claim 1, characterized in that, near at least one of the ends of a path of travel formed by a cavity in the at least one motion element, a switching element is placed.

22. The motion detector according to claim 1, characterized in that, next to a path of travel formed by a cavity in the at least one motion element, in a position located between the two ends of the path of travel, a switching element is placed.

23. The motion detector according to claim 1, characterized in that the motion detector comprises a number of motion elements with corresponding switching elements, wherein the paths of travel formed by cavities in the respective motion elements have different directions.

24. The motion detector according to claim 1, characterized in that at least one motion element together with at least one switching element forms one integral component.

25. The motion detector according to claim 1, characterized in that the at least one motion element is fixed on a mounting plate, which also bears an electronic circuit.

26. The motion detector according to claim 25, characterized in that the mounting plate also bears the switching elements.

27. The motion detector according to claim 25, wherein two or more motion elements are used, characterized in that the paths of travel formed by cavities in the respective motion elements have opposite inclinations with respect to the mounting plate.

28. The motion detector according to claim 1, characterized in that the motion detector is designed to count the number of excitations of at least one of the other switching elements.

* * * * *

UNITED STATES PATENT AND TRADEMARK OFFICE
CERTIFICATE OF CORRECTION

| | | |
|---|---|---|
| PATENT NO. | : 8,169,333 B2 | Page 1 of 1 |
| APPLICATION NO. | : 12/085166 | |
| DATED | : May 1, 2012 | |
| INVENTOR(S) | : Albertino Bernardo Maria Verstege | |

It is certified that error appears in the above-identified patent and that said Letters Patent is hereby corrected as shown below:

Title Page Item 22 correct PCT Filed to -- November 20, 2006 --.

Signed and Sealed this
Third Day of July, 2012

David J. Kappos
*Director of the United States Patent and Trademark Office*